Nov. 7, 1933.  R. N. FRIEND  1,934,349
TUBULAR FIRE ESCAPE CONSTRUCTION
Original Filed April 13, 1928   3 Sheets-Sheet 1
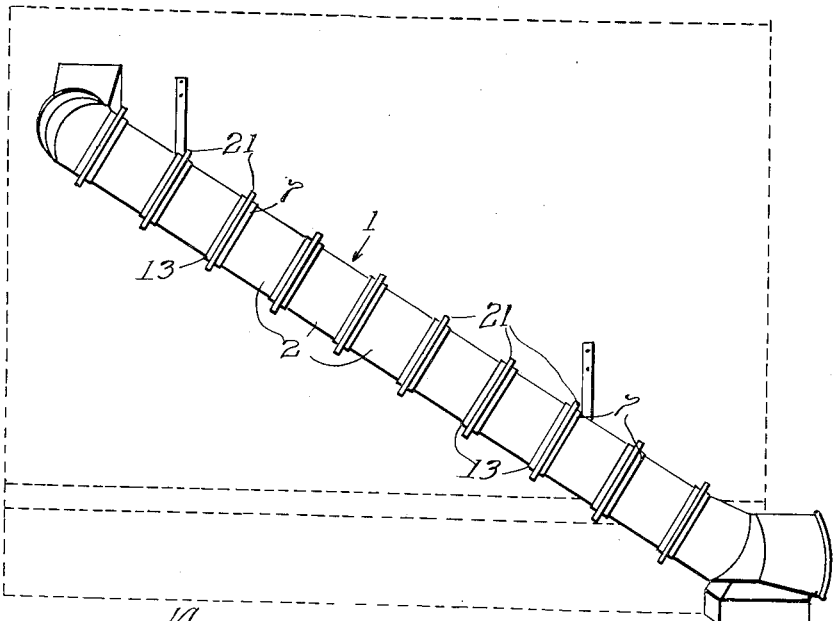
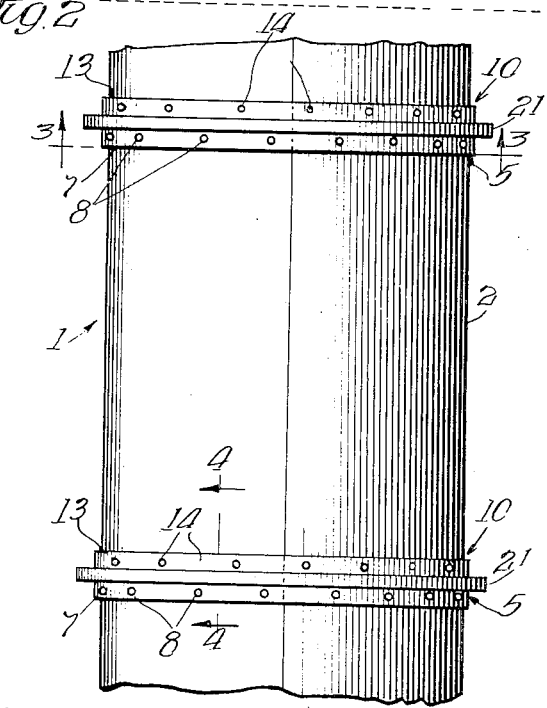
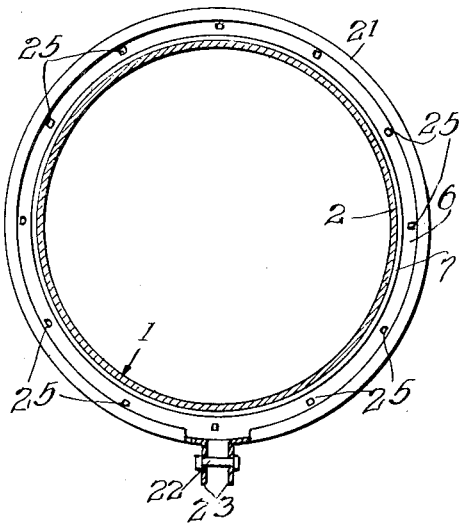

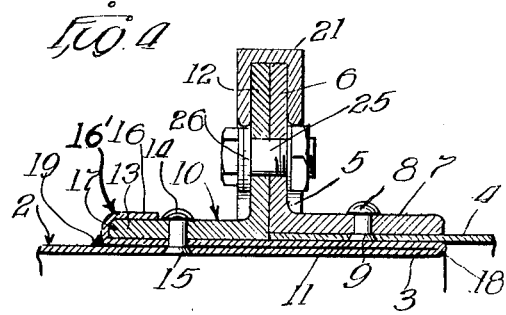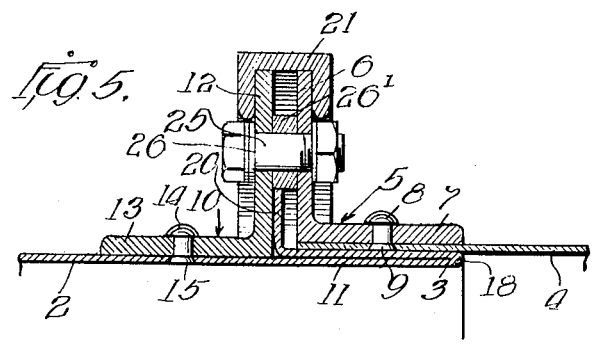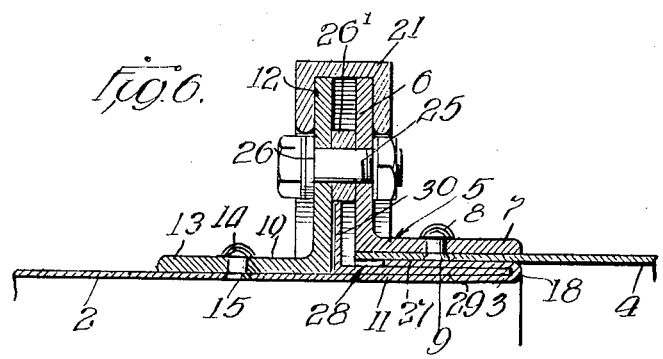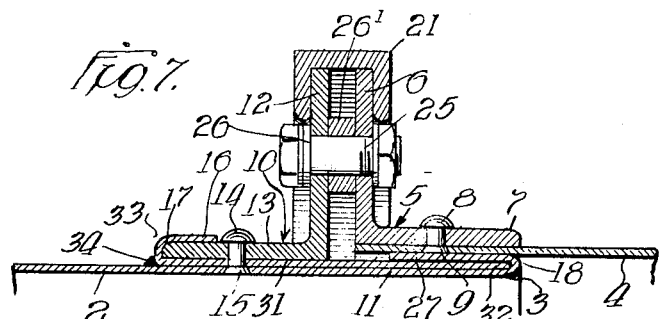

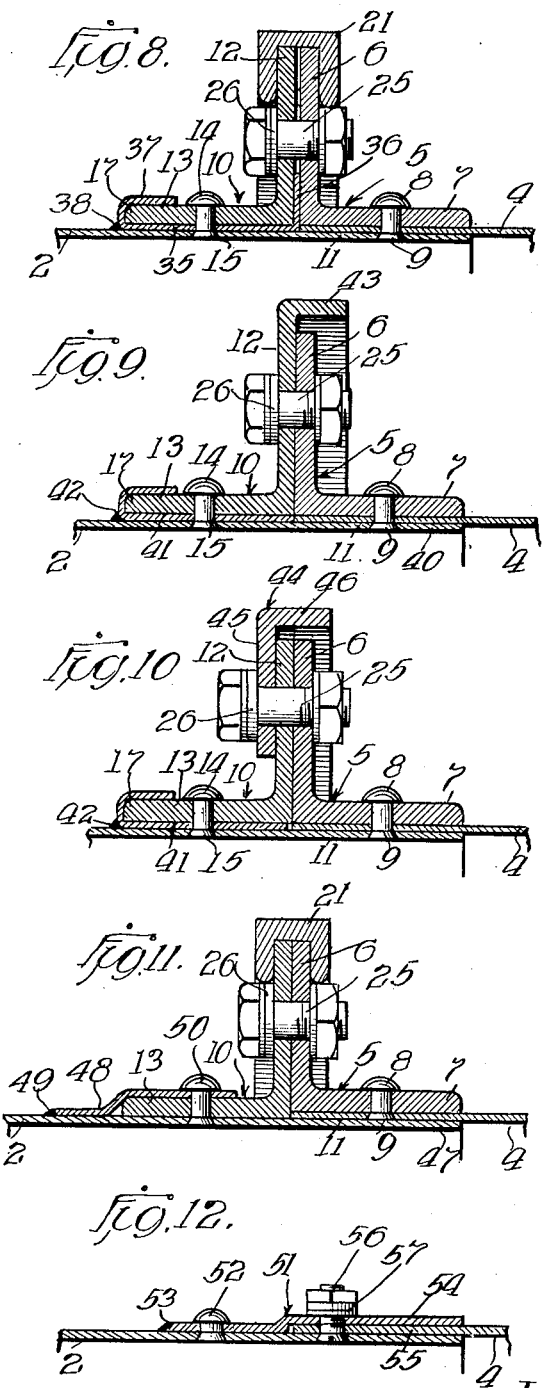

Patented Nov. 7, 1933

1,934,349

UNITED STATES PATENT OFFICE 1,934,349

TUBULAR FIRE ESCAPE CONSTRUCTION

Richard Nason Friend, Sioux City, Iowa, assignor to Potter Manufacturing Corporation, Chicago, Ill., a corporation of Delaware Original application April 13, 1928, Serial No. 269,803. Divided and this application July 15, 1931. Serial No. 550,980

4 Claims. (Cl. 285—137)

The invention relates especially to improvements in the joints of tubular fire escapes.

The object of the invention is to provide a joint for this purpose which, when the tube is vertical or inclined at a substantial angle to the horizontal, will prevent water which is flowing down the outer surface of the tube entering through the joints joining sections into the interior of the tube; and which shall be capable of being produced in the factory or shop and shipped to the place of erection without any great possibility of damage in transportation.

Such fire escapes are produced in tubular sections which are shipped to the place of erection and are then secured end to end in erecting the fire escape.

The walls of these sections are usually made of heavy galvanized iron sheets and the ends are provided with angle iron reinforcing rings which are adapted to be bolted together in building the fire escape. As in the use of such a fire escape, the one using it slides down the tube, the lower ends of the sections telescope into the upper ends of the next lower sections in order to avoid edges which would be objectionable for such use.

While the angle iron flanges are tightly riveted in place, being made of black iron, they do not lend themselves to the production of water-tight joints and the consequence is that water leaks into the tubes between the flanges and the angle irons, not only rusting out the connections but causing dampness in the tubes with the accumulation of dust, dirt and rust, all of which is very objectionable, especially when these fire escapes are used on schools and the children are frequently put through fire drills without the tubes being cleaned.

My invention resides in a joint wherein the lower ends of the sections so formed and arranged in relation to the upper ends of the adjacent sections, that water running down the outside of the tube cannot leak through into the tube, the joint either being sealed against the entrance of water between the members which form the joint or the joint so constructed that if water does enter between the members of the joint, it is effectively prevented from entering the tube.

This present application is a divisional application, the original application which was co-pending having been filed on April 13, 1928, Serial No. 269,803, now Patent No. 1,819,086.

One form of the invention includes the turning back of the lower ends of the sheet metal sections upon themselves and the outward flanging of this turned back end to form a water seal or the addition of a separate sheet metal ring member projecting beneath the turned back end and flanged out at its other edge to form a water seal.

An important feature of my invention is the provision of a member adapted to overlap the upper edge of the uppermost of the connecting angle iron rings to shed water over such edge and which overlapping water shedding member shall be capable of being effectively joined to the lower end of the tubular section in a water-tight condition, such as by being soldered thereto.

Another point which is included in my invention of a water-tight joint is that of covering the joint between the two angle iron flanges, of a joint, so that water cannot enter between them from the outside especially on the upper side of an inclined tube.

Another feature relates to means for sealing the bolt holes in the connecting flanges of the angle irons to prevent water entering between the angle iron rings at these points.

By reference to the accompanying drawings forming part of this specification, it will be seen that I have worked out the general idea in a number of different specific ways but that all thereof are effective to accomplish the results desired, viz: the production of a water-shedding joint of a permanent character for large tubes and which tubes can be shipped in sections without danger of damage to the ends of the sections which form the joints.

My invention will be more readily understood by reference to said drawings and in which:

Fig. 1 is an elevational view of a fire escape constructed in accordance with my invention;

Fig. 2 is a fragmentary, enlarged, side elevation of a portion of the tube;

Fig. 3 is a cross-section of the tube on the line 3—3 of Fig. 2;

Fig. 4 is an enlarged, fragmentary, longitudinal section through one of the joints and taken on the line 4—4 of Fig. 2;

Fig. 5 is a view similar to Fig. 4 and showing a slight modification;

Figs. 6 and 7 are views similar to Fig. 4 showing other slight modifications of form shown in Fig. 4;

Figs. 8, 9, 10 and 11 are views similar to Fig. 4 showing other slightly modified forms of the invention, all including the angle connecting rings; and Fig. 12 is a view similar to Fig. 4 showing a simple form of joint without the use of angle rings.

In said drawings, 1 illustrates a tubular fire escape down which the ones escaping from the fire can slide from an elevated position to the ground. The fire escape is adapted to be arranged in an inclined position outside of a building and connected at its upper end to an opening in the wall of the building by which access is attained to the fire escape.

The escape, being outside of the building, is exposed to the weather. The tube necessarily being of rather large diameter and of considerable length cannot be shipped and erected in one piece, but has to be made of sections and put together at the place of erection.

My invention has to do with the construction of the connections or joints between the tubular sections, to the end that they shall not permit water to enter the tube from the outside. It should be understood that the practical application of my invention is not limited to use in fire escapes but that it can be beneficially applied to tubular structures for other uses.

As illustrated, the fire escape 1 is made up of a plurality of tubular sections 2. In practice these sections are about 4 or 5 feet long, depending on the width of the sheets which are used to make the sections.

While the several drawings illustrating the construction of the joints between sections are made with the walls of the tube shown as extending horizontally, it should be understood that the joints are designed to be used on a vertical or inclined tube rather than on a horizontal tube.

Referring now to Fig. 4, the lower end 3 of the upper section 2 is shown as entering within the upper end 4 of an adjacent lower section 2. This construction is necessary so that as a person slides down the tube, there will not be any edge which will tend to impede his progress.

Preferably, the tubular sections 2 are made of galvanized sheet iron. This is for the purpose of assisting in preventing the tube rusting out. Each section, preferably, has an angle iron connector ring secured near each of its ends. The angle iron ring 5 at the upper end 4 of the section is placed so that the outwardly projecting leg 6 is substantially flush with the end of the section and the inner leg 7 is secured upon the outer surface of the section by rivets 8 having flat or countersunk heads 9 at their inner ends. The angle iron ring 10, secured to the lower end of the section, is spaced inwardly from the end of the section to provide a projecting nozzle 11 for entering within the upper end of the next lower section, as described. This angle iron ring 10 likewise has one leg 12 projecting outwardly and its other leg 13 secured upon the outer surface of the tubular section by rivets 14 with flat or countersunk heads 15 at their inner ends.

These angle iron rings are made of black or ungalvanized iron and the joints which have to be sealed to prevent the leakage of water is that between the two angle iron rings and that between the leg 13 of the ring 10 and the outer surface of the section 2. The leakage of water at these points not only lets water into the main tube where it tends to collect dirt and dust, but also it tends to rust out the rivets and the walls of the tube around the rivets and tends to cause rapid deterioration of the tube at the joints.

The angle iron connector rings 5 and 10, being of black or ungalvanized iron, cannot be permanently sealed to the tube in any practical manner. It has been tried to seal this joint by various packing materials, paint or cement, but none thereof has proven permanent enough. All either dry out or harden and crack due to weather conditions and the expansion and contraction of the walls of the fire escape, hence this invention.

In order to close the joint between the leg 13 of the lower angle iron connector 10, and the outer surface of the tubular section upon which it is secured, I provide a water shedding member 16 having an edge portion, flange or skirt 16', which overlaps the upper edge 17 of the leg 13 and extends downwardly outside of said leg, and by some suitable means I prevent any water through between the outer surface of the section 2 and the adjacent wall of the member 16.

As shown in Fig. 4, the inner edge of the water shedding member 16 is sealed to the lower end of the tubular section by its peculiar method of formation.

To form this water shedding member, the lower edge of the sheet of which the tubular section is to be made is folded back on itself, as shown at 18, preferably while the sheet is flat, and then the free edge portion is formed back on itself to provide the flange or skirt 16', then the sheet is rolled up to form the tube. As a further precaution and to prevent water entering between the tube and the folded back flange, the flange may also be sealed to the tube at its upper end by solder, as shown at 19.

As shown in the drawings, this water shedding member may take different forms but, in all the forms thereof, it will be seen that water running down the outer surface of the tube is prevented entering into the tube.

In Fig. 5, instead of the formed back lower edge portion of the upper section extending up around the upper edge of the inner flange 13 of the angle member 10, it is formed outwardly to provide an outwardly extending circumferential flange 20 projecting between the two angle members.

In the form of joint shown in Fig. 4, the joint between the opposed outwardly extending legs 6 and 12 of the angle members 5 and 10 is covered by a U-shaped ring 21 which fits over these legs and is adapted to be clamped in place by a bolt 22, see Fig. 3, the ring being formed with opposed lugs 23 for this purpose.

It should be understood that this bolted connection is always arranged at the lower side of the tube where the tube is inclined or horizontal.

The legs 6 and 12 of the angle members are clamped together to hold the sections of the tube together by bolts 25 and the bolt holes in the flanges 6 and 12 can be made watertight in any suitable manner, as by means of lead washers 26 beneath the head of the bolt which is arranged on the upper side of the joint.

As the form of joint shown in Fig. 5 has a water shedding flange 20 extending out between the outer legs 6 and 12 of the two angle members, it is not convenient to draw these two legs tightly together, as shown in Fig. 4, and they are spaced apart by lead washers 26' on the bolts 25, which not only space the angle members apart to make room for the flange 20 but also seal the bolt holes. In this form also, the joint between the legs 6 and 12 is covered by the U-shaped ring 21.

In Figs. 6 and 7, there are shown forms where the water shedding member is not integral with the lower end of the upper section, but is a separate ring member. In these forms the lower end of the upper section 2 is folded back upon itself to some extent, as shown at 27, sufficient to form a strong, rigid nozzle 11 to withstand the abuse in shipping, and a water shedding ring member 28 is provided, as shown in Fig. 6, which has a longitudinal leg 29 adapted to be projected down between the tube and the turned back flange 27 and an outwardly extending circumferential flange 30 adapted to extend out between the opposed legs 6 and 12 of the angle members 5 and 10, similar to the construction shown in Fig. 5.

In Fig. 7 is shown a form which combines the ideas involved in Figs. 4 and 6, in that the lower edge portion of the section is turned back on itself, as shown at 27, and a separate water shedding ring member 31 which extends beneath the inner leg 13 of the angle member 10 and its lower edge 32 extends down beneath the turned back flange 27. The upper edge portion 33 of the member 31 is turned back on itself and is formed over the upper edge portion 17 of the inner leg 13 of the angle member 10, similar to the construction shown in Fig. 4. In this form, also, the water sealing member may be soldered to the outer surface of the section 2 at its upper end, as shown at 34.

In the form shown in Fig. 6, the bolt holes in the outer legs 6 and 12 may be sealed by the lead washers 26' between the legs while, in the form shown in Fig. 7, they may be sealed by the lead washers 26 beneath the heads of the bolts, as shown in Fig. 4.

In Fig. 8 there is shown a form of joint embodying the invention in a simple form but not including the double thickness nozzle shown in Figs. 4 to 7, inclusive. In this form a water shedding ring member 35 is shown, which extends beneath the inner leg 13 of the angle member 10 and is formed at its lower edge to provide a water shedding flange 36 extending outwardly between the opposed flanges 6 and 12 of the two angle members 5 and 10 in contact with the flange 12. Its upper edge portion is turned back around the upper edge 17 of the flange 13, as shown at 37, similar to the construction shown in Fig. 4.

In this form, the actual sealing of the joint between the water shedding member 35 and the outer surface of the tube is accomplished by soldering the water shedding member to the outer surface of the tube at its upper edge, as shown at 38. In this form of joint, the sealing U-shaped ring 21 is used as well as the lead sealing washers 26.

In Fig. 9 is shown a form of joint somewhat similar to the form shown in Fig. 8, in that the projecting nozzle 40 is of single thickness and the water shedding member 41 has its upper edge portion formed back around the edge portion 17 of the inner leg 13 of the angle member 10, but the opposite edge of the water shedding member is not flanged out between the opposed legs of the angle members 5 and 10. In this form, as in the form shown in Fig. 8, the actual sealing is formed by the soldering of the water shedding member at its upper edge to the outer surface of the tube, as shown at 42. In this form of joint, instead of using the U-shaped sealing ring 21, the outer leg 12 of the upper angle member 10 is provided with a longitudinally extending or depending circumferential flange 43, which extends over the outer leg 6 of the angle member 5 and effectively sheds water past same. In this form the lead washers 26 are used on the bolts 25.

In Fig. 10 is shown a form of joint in which the advantages of the overhanging flange 43 are obtained from commercial forms of angle members instead of a special form, as shown in Fig. 9. In this form the two angle members 5 and 10 are used and a third and smaller angle member 44 is used, one leg 45 of which is bolted against the upper face of the outer leg 12 of the angle member 10 by the bolts 25, and the other leg 46 of the member 44 projects downwardly and overlaps the outer leg 6 of the angle member 5. In this form the lead washers 26 are used to seal the bolt holes and the sealing ring 41 is like the sealing ring shown in Fig. 9.

The forms shown in Figs. 8, 9 and 10 are especially useful in connection with building fire escapes as the water shedding ring members 37 and 41 can be adjusted from or toward the adjacent end of the section upon which they are used to adjust the effective length of the section to accord with the space it is to fill. This form of joint is usually used on the last section of the fire escape to be erected. The soldering for the final sealing is done after the parts are secured in place.

In Fig. 11 is shown a very simple form of the invention which includes a single thickness nozzle 47 on the lower end of the upper section, as shown in Figs. 8 to 10, inclusive. In this form, the water shedding member, instead of being formed to extend beneath the leg 13 of the angle member 10, is formed to extend away from same, up the tube, as shown at 48, and its upper edge is sealed to the outer surface of the tube by soldering, as indicated at 49. The lower edge portion of the water shedding ring is formed over the flange 13 and the member 48 is secured in position by the rivets 50 with which the angle member 10 is secured. In this form of joint the U-shaped sealing ring 21 is used and also the lead washers 26 on the bolts 25.

In Fig. 12 an even simpler form of water shedding joint is shown. This joint consists of a water shedding member 51 having its upper edge portion secured upon the outer surface of the tube by rivets 52 and sealed to said surface by soldering, as shown at 53. The lower edge portion is formed out from the surface of the section to which it is secured sufficiently, as shown at 54, to form a slot to receive the upper edge 55 of the lower section, and the two sections are secured together by radial fasteners, such as the bolts 56, and lead washers 57 may be used on the bolts to assure their being tight. In this form the co-operating end of the lower section is of single thickness and is not protected by an angle iron ring.

The forms shown in Figs. 8 to 12, inclusive, are of value for some purposes even though they do not stand the abuse of shipping as well as the other forms.

As many other modifications of the invention will readily suggest themselves to one skilled in the art, I do not limit or confine the invention to the specific details of construction or combinations of parts herein shown and described except within the scope of the appended claims.

I claim:

1. In a fire escape made up of tubular sections, a connection for two sections, comprising opposed angle member rings secured upon the outer surfaces of the two adjacent ends of two sections, the end of the upper section projecting beyond its angle iron connector and adapted to enter and fit in the adjacent end of the next lower section, the lower end of the upper section turned back upon itself, and an angle shaped water shedding sheet metal member, having one leg projected down beneath said turned back part and the opposite leg projecting out between the opposed legs of the connecting angle members.

2. In a fire escape made up of tubular sections, a connection for two sections, comprising opposed angle member rings secured upon the outer surfaces of the two adjacent ends of two sections, the end of the upper section projecting beyond its angle iron connector and adapted to enter and fit in the adjacent end of the next lower section, and a part connected with the lower end of the upper section extending up beneath the angle member on the lower section, the upper edge of said part being turned outwardly between the two angle member connectors.

3. In a fire escape made up of tubular sections, a connection for two sections, comprising opposed angle member rings secured upon the outer surfaces of the two adjacent ends of two sections, the end of the upper section projecting beyond its angle iron connector and adapted to enter and fit in the adjacent end of the next lower section, the lower end of the upper section turned back upon itself beneath the angle member on the opposite section and a sheet metal angle member having one leg inserted under the turned back end of the upper section and the other leg projecting out radially between the two angle members.

4. In a fire escape made up of tubular sections, a connection for two sections, comprising opposed angle member rings secured upon the outer surfaces of the two adjacent ends of two sections, the end of the upper section projecting beyond its angle iron connector and adapted to enter and fit in the adjacent end of the next lower section, the lower end of the upper section turned back upon itself beneath the angle member on the opposite section and a sheet metal angle member having one leg inserted under the turned back end of the upper section and the other leg projecting outwardly from the outer surface of the outer member to prevent water running down the structure between said outwardly-flanged member and the lower angle member.

RICHARD NASON FRIEND.